United States Patent
Goossen et al.

(10) Patent No.: US 8,707,317 B2
(45) Date of Patent: *Apr. 22, 2014

(54) RESERVING A FIXED AMOUNT OF HARDWARE RESOURCES OF A MULTIMEDIA CONSOLE FOR SYSTEM APPLICATION AND CONTROLLING THE UNRESERVED RESOURCES BY THE MULTIMEDIA APPLICATION

(75) Inventors: J. Andrew. Goossen, Issaquah, WA (US); Michael Cory Maston, Sammamish, WA (US); Tracy C. Sharpe, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2161 days.

This patent is subject to a terminal disclaimer.

(21) Appl. No.: 10/836,890

(22) Filed: Apr. 30, 2004

(65) Prior Publication Data

US 2005/0262255 A1 Nov. 24, 2005

(51) Int. Cl.
*G06F 9/46* (2006.01)
*G06F 9/50* (2006.01)
*G06F 9/48* (2006.01)

(52) U.S. Cl.
CPC ............ *G06F 9/50* (2013.01); *G06F 9/5011* (2013.01); *G06F 9/48* (2013.01); *G06F 9/4843* (2013.01)
USPC ........... 718/104; 718/100; 718/102; 718/103; 718/108

(58) Field of Classification Search
CPC ........... G06F 9/50; G06F 9/5011; G06F 9/48; G06F 9/4843
USPC .......................................... 718/100, 102, 104

See application file for complete search history.

(56) References Cited

U.S. PATENT DOCUMENTS

| | | | | |
|---|---|---|---|---|
| 5,012,409 A * | 4/1991 | Fletcher et al. | ............... | 718/103 |
| 5,109,512 A * | 4/1992 | Bahr et al. | ............... | 718/103 |
| 5,230,065 A * | 7/1993 | Curley et al. | ............... | 709/226 |
| 5,440,740 A * | 8/1995 | Chen et al. | ............... | 718/104 |
| 5,442,789 A * | 8/1995 | Baker et al. | ............... | 718/105 |

(Continued)

FOREIGN PATENT DOCUMENTS

| | | |
|---|---|---|
| EP | 1 341 083 A2 | 9/2003 |
| JP | 11-149385 A | 6/1999 |

(Continued)

OTHER PUBLICATIONS

Mercer et al. ("Processor capacity reserves: Operating system support for multimedia applications", 1994, IEEE, pp. 90-99.*

(Continued)

*Primary Examiner* — Meng An
*Assistant Examiner* — Caroline H Arcos
(74) *Attorney, Agent, or Firm* — Bryan Webster; Andrew Sanders; Micky Minhas

(57) ABSTRACT

A system and method provides a high level of system functionality in a multimedia console through the use of system applications, while reducing any corresponding lack of control that multimedia applications will have while running on the console. A predetermined amount of hardware resources of the multimedia console is reserved. The system application is executed substantially using the predetermined amount of reserved hardware resources and the multimedia application is executed substantially within the remaining unreserved hardware resources.

30 Claims, 6 Drawing Sheets

(56) References Cited

U.S. PATENT DOCUMENTS

| | | | |
|---|---|---|---|
| 5,452,452 A * | 9/1995 | Gaetner et al. | 718/103 |
| 5,594,903 A * | 1/1997 | Bunnell et al. | 717/162 |
| 5,739,815 A | 4/1998 | Mizutani | 345/199 |
| 5,784,616 A * | 7/1998 | Horvitz | 718/102 |
| 5,854,894 A * | 12/1998 | Lancaster et al. | 709/219 |
| 6,032,240 A * | 2/2000 | Brown | 711/173 |
| 6,061,709 A * | 5/2000 | Bronte | 718/103 |
| 6,078,942 A | 6/2000 | Eisler et al. | 709/100 |
| 6,128,713 A | 10/2000 | Eisler et al. | 711/159 |
| 6,202,060 B1 * | 3/2001 | Tran | 707/3 |
| 6,223,201 B1 * | 4/2001 | Reznak | 718/102 |
| 6,282,560 B1 * | 8/2001 | Eilert et al. | 718/100 |
| 6,301,604 B1 * | 10/2001 | Nojima | 718/108 |
| 6,338,130 B1 * | 1/2002 | Sinibaldi et al. | 712/35 |
| 6,345,293 B1 | 2/2002 | Chaddha | 709/219 |
| 6,345,305 B1 * | 2/2002 | Beck et al. | 709/242 |
| 6,401,211 B1 | 6/2002 | Brezak, Jr. et al. | 713/201 |
| 6,526,416 B1 | 2/2003 | Long | 707/202 |
| 6,594,375 B1 * | 7/2003 | Kato et al. | 382/107 |
| 6,631,394 B1 * | 10/2003 | Ronkka et al. | 718/100 |
| 6,654,780 B1 * | 11/2003 | Eilert et al. | 718/104 |
| 6,718,360 B1 | 4/2004 | Jones et al. | 709/107 |
| 6,848,997 B1 * | 2/2005 | Hashimoto et al. | 463/42 |
| 7,075,541 B2 * | 7/2006 | Diard | 345/505 |
| 7,107,363 B2 * | 9/2006 | Brown et al. | 710/18 |
| 7,137,119 B1 * | 11/2006 | Sankaranarayan et al. | 718/103 |
| 7,165,255 B2 * | 1/2007 | Czajkowski et al. | 718/104 |
| 7,191,440 B2 * | 3/2007 | Cota-Robles et al. | 718/1 |
| 7,203,942 B2 * | 4/2007 | Lafruit et al. | 718/100 |
| 7,222,062 B2 * | 5/2007 | Goud et al. | 703/23 |
| 7,266,823 B2 * | 9/2007 | Alford, Jr. | 718/104 |
| 7,272,413 B2 * | 9/2007 | Yu | 455/552.1 |
| 7,293,091 B2 * | 11/2007 | Eatough et al. | 709/226 |
| 7,325,233 B2 * | 1/2008 | Kuck et al. | 718/103 |
| 7,356,817 B1 * | 4/2008 | Cota-Robles et al. | 718/1 |
| 2001/0016879 A1 * | 8/2001 | Sekiguchi et al. | 709/319 |
| 2002/0002458 A1 * | 1/2002 | Owen et al. | 704/260 |
| 2002/0161817 A1 * | 10/2002 | Dorofeev et al. | 709/104 |
| 2003/0027637 A1 * | 2/2003 | Sato | 463/42 |
| 2004/0068730 A1 * | 4/2004 | Miller et al. | 718/106 |
| 2004/0187120 A1 * | 9/2004 | Moore et al. | 718/100 |
| 2004/0226015 A1 * | 11/2004 | Leonard et al. | 718/100 |
| 2005/0223383 A1 * | 10/2005 | Tetrick | 718/104 |
| 2005/0246709 A1 * | 11/2005 | Simon et al. | 718/104 |

FOREIGN PATENT DOCUMENTS

| | | |
|---|---|---|
| JP | 2000-242512 A | 9/2000 |
| JP | 2001-331333 A | 11/2001 |
| JP | 2004-062911 A | 2/2004 |
| WO | WO 00/63776 | 10/2000 |
| WO | WO 01/75602 | 10/2001 |

OTHER PUBLICATIONS

Jones at al. ("CPU reservation and time constraints: efficient, predictable scheduling of independent activities", Microsoft research, Microsoft corporation, 1997, pp. 1-24).*

Microsoft ("Microsoft Windows NT Workstation Resource kit, comprehensive resource guide and utilities for windows NT workstation version 4.0", Microsoft press, 1996, pp. 422-467).*

Jones, M.B. et al., "CPU Reservations and time Constraints: Efficient, Predictable Scheduling of Independent Activities", http://research.microsoft.com/~mbj/papers/sosp97/sosp97.html, Feb. 24, 2004, 24 pages.

Kalavade, A. et al., "AsaP—A Framework for Evaluating Run-time Schedulers in Embedded Multimedia End-Systems", *ACM*, 1998, 291-296.

Nieh, J. et al., "A SMART Scheduler for Multimedia Applications", *ACM Transactions on Computer Systems*, May 2003, 21(2), 117-163.

Poellabauer, C. et al., "Coordinated CPU and Event Scheduling for Distributed Multimedia Applications", *MM*, 2001, 231-240.

Tivo® Remote Control, Hints and Shortcuts, Inserting Batteries in the remote Control, Setting up the Remote to Control your TV, The TiVo Menus and the remote Control, 2 Pages.

Waldspurger, C.A., "Memory Resource Management in VMware ESX Server", *5th Symposium on Operating Systems Design and Implementation(OSDI)*,Dec. 9-11, 2002, 181-194.

Bollella, G. et al., "Support for Real-Time Computing within General Purpose Operating Systems", *Proceedings, Real-Time Technology and Applications Symposium, IEEE Computer Society*, 1995, 4-14, XP 002447601.

Stallings, W., "Betriebssysteme", 2003, 528-529.

"Linux Device Drivers", $2^{nd}$ edition on Linux 2.4, O'Reilly, Chapter 7, pp. 208-225, 2001.

* cited by examiner

RESERVING A FIXED AMOUNT OF HARDWARE RESOURCES OF A MULTIMEDIA CONSOLE FOR SYSTEM APPLICATION AND CONTROLLING THE UNRESERVED RESOURCES BY THE MULTIMEDIA APPLICATION

FIELD OF THE INVENTION

This invention generally relates to the field of multimedia consoles. In particular, the invention is directed to a system and method that facilitates system functionalities in a multimedia console.

BACKGROUND OF THE INVENTION

Multimedia consoles, such as video game consoles, have traditionally provided an operating system that "gets out of the way" of the developer. In particular, in conventional video game consoles the game developers are provided with near total control of the hardware and the operating system is driven by the multimedia application. As game software is often developed for a particular platform, the available hardware resources (e.g., memory, processor, etc.) and their characteristics (e.g., memory size, processor speed, etc.) are well known. This architecture provides developers complete autonomy and insight into how every CPU cycle is used. Thus, software developers can manage and maximize the usage of the hardware resources and provide a high performance multimedia application. For example, software game developers could be assured that the same amount of memory would always be available, that the CPU would not be consumed by another application or system feature introduced after the game was released, etc. The disadvantage to this approach is that any system functionality that is desired to be provided to the user, must be programmed into the multimedia application. This approach may require the multimedia developer to make significant investments in programming. Another drawback is that the user's experience may differ significantly among different multimedia applications because each multimedia application may provide its own particular user interface to system resources.

The other end of the continuum of resource control is found in the conventional personal computer (PC), in which applications typically have limited control over the underlying functionality of the operating system. This approach provides a large amount of functionality in the operating system, without requiring that it be controlled by the application. Further, this provides for multiple applications to run simultaneously without requiring them to be aware of each other. The drawback of this approach is that an application has much less control over each CPU cycle, and has to be architected to assume that it is not the only application running. As such, applications have no particular guarantee that they will get a certain amount of physical RAM or that they will not get starved by another application consuming significant amounts of CPU time.

As multimedia consoles grow in power there will probably be a greater demand to provide system services to multimedia applications while maintaining the benefits of existing multimedia console operating systems where developers have almost full control of system resources. Thus, there is a need for a system and method for providing system services in a multimedia console to enable more system functionalities, while maintaining the multimedia application's high level of control over the system operating and hardware resources.

SUMMARY OF THE INVENTION

The invention is directed to a system and method that addresses the limitations of existing multimedia consoles by providing system functionality through system applications, while allowing the multimedia to retain substantial control over the hardware resources of the multimedia console. A predetermined amount of multimedia console hardware resources are reserved for the system applications while the remainder of hardware resources are controlled by the multimedia application. In this manner, the multimedia application retains substantial control over hardware resources, unlike applications executing in conventional personal computing (PC) operating systems which have little control over hardware resources. As such, multimedia applications do not need to directly support system functionalities such as required in conventional systems and yet system functionality may still be provided. The system applications provide the system functionalities via the reserved hardware resources while the multimedia application executes on the remaining hardware resources. Further, the amount of reserved resources may be based on a graphics processing unit generated interrupt. In this manner, system applications may be executed at a time when it is more likely that hardware resources demand is low.

The systems and methods described herein may be implemented in other constrained environments such as set-top boxes, embedded systems, etc. Additional features of the invention will be made apparent from the following detailed description of illustrative embodiments that proceeds with reference to the accompanying drawings.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings illustrative embodiments of the invention; however, the invention is not limited to the specific methods and instrumentalities disclosed. In the drawings.

DETAILED DESCRIPTION OF ILLUSTRATIVE EMBODIMENTS

Figure 1:
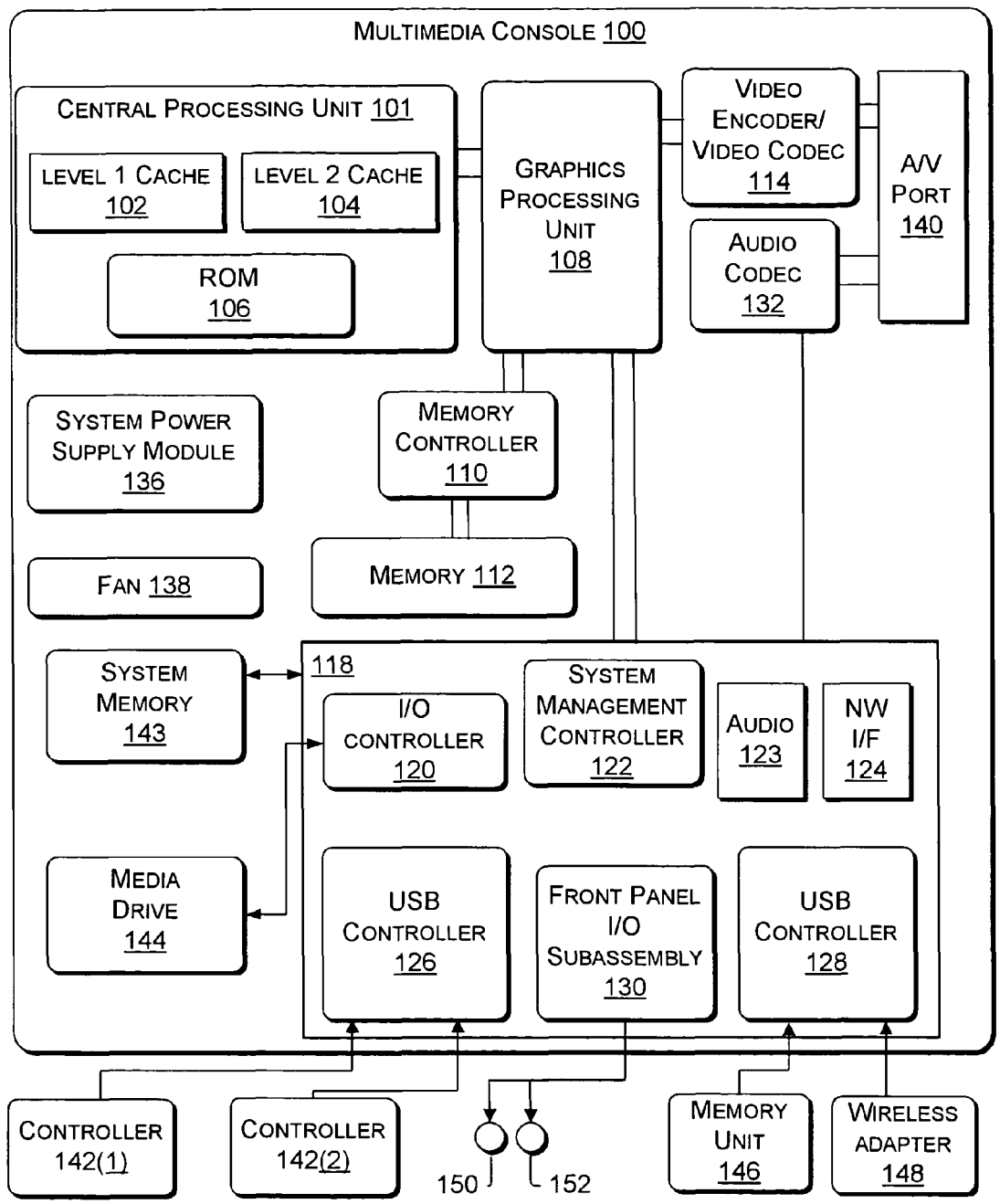
FIG. 1 is a block diagram showing an exemplary multimedia console, in which aspects of the invention may be implemented.

FIG. 1 illustrates the functional components of a multimedia console 100 in which aspects of the invention may be implemented. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101.

A graphics processing unit (GPU) 108 and a video encoder/video codec (coder/decoder) 114 form a video processing-pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

Figure 2:
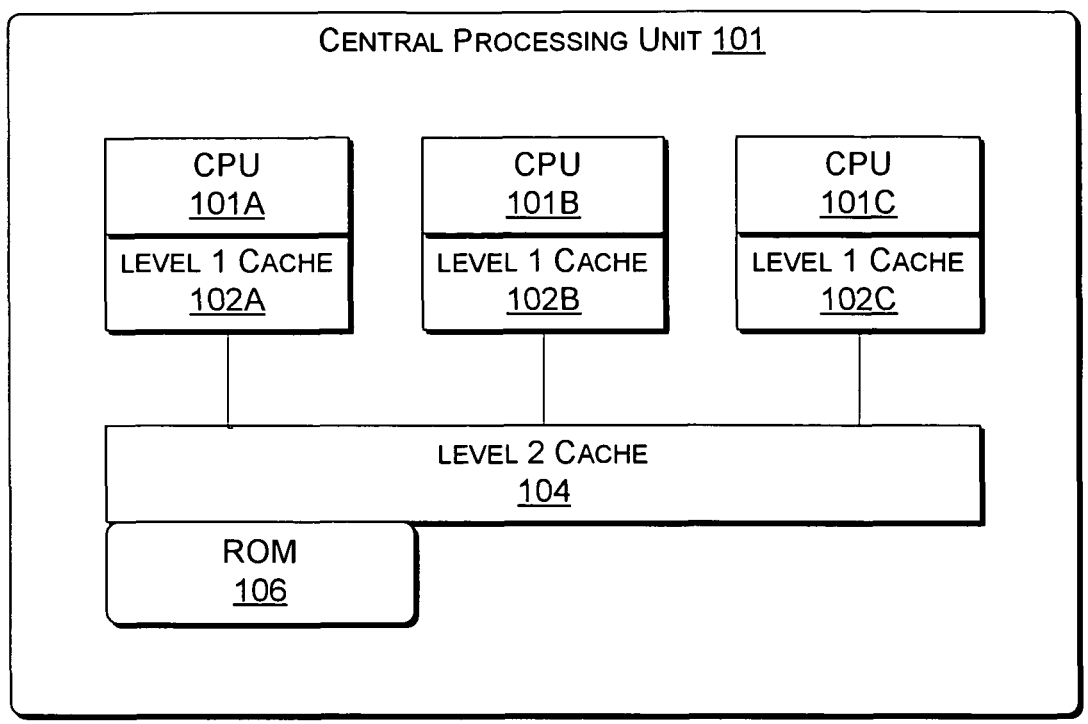
FIG. 2 is a block diagram showing further details of the exemplary multimedia console of FIG. 1, in which aspects of the invention may be implemented.

FIG. 2 shows further details of the exemplary multimedia console of FIG. 1. As shown in FIG. 2, CPU 101 comprises three CPUs: CPU 101A, CPU 101B, and CPU 101C. As shown, each CPU has a corresponding L1 cache 102 (e.g., L1 cache 102A, 102B, and 102C, respectively). As shown, each CPU 101A-C is in communication with L2 cache 104. As such, the individual CPUs 101A, B, and C share L2 cache 104. Because L2 cache 104 is shared between multiple CPU's, it may be complex to implement a technique for reserving a portion of the L2 cache for system applications. While three CPUs are illustrated, there could be any number of CPUs.

The multimedia console depicted in FIGS. 1 and 2 is a typical multimedia console that may be used to execute a multimedia application, such as, for example, a game. Multimedia applications may be enhanced with system features including for example, system settings, voice chat, networked gaming, the capability of interacting with other users over a network, e-mail, a browser application, etc. Such system features enable improved functionality for multimedia console 100, such as, for example, players in different locations can play a common game via the Internet.

Also, over time, system features may be updated or added to a multimedia application. Rather than requiring the multimedia developer to make significant modifications to the multimedia application to provide these system features, the systems and methods described herein allow a multimedia developer to provide system features through separate system applications that work in conjunction with the multimedia application. For example, a system application may embody functionality related to networked capabilities, thereby enabling a multimedia application to be readily adapted to provide networked capabilities with little work by the multimedia (e.g., game) developer. With conventional architectures, a multimedia developer may have to make a great deal of development effort to modify the multimedia application to provide networked capabilities. Some developers may forego developing this feature because of the associated cost. System applications embodying such functionality may encourage multimedia developers to include more features than they would otherwise.

A system and method is provided that is directed to an application/operating system. Unlike conventional multimedia console operating systems, the system and method allow developers to utilize system applications to implement system functions, without having to explicitly incorporate or handle user access to system functionality directly within the multimedia application. By providing access to system functionality via system applications, users may obtain the concurrent application and rich system functionality benefits as in PC operating systems, without indeterminately taking control of system resources away from the multimedia application. Because multimedia developers, such as game developers, typically assume that system behavior is stable and deterministic over time, system applications may be constrained such that they take a fixed amount of system resources over the life of the product and do not present a varying resource signature at runtime. The system and method reserves a portion of multimedia console hardware resources for use by system applications to provide system features to the multimedia application. In order to present a consistent, unchanging resource usage signature for system applications, a number of different system resources may be managed. These resources may include the CPU, cache memory, main memory, audio channels, game controller input, and the like.

Figure 3:
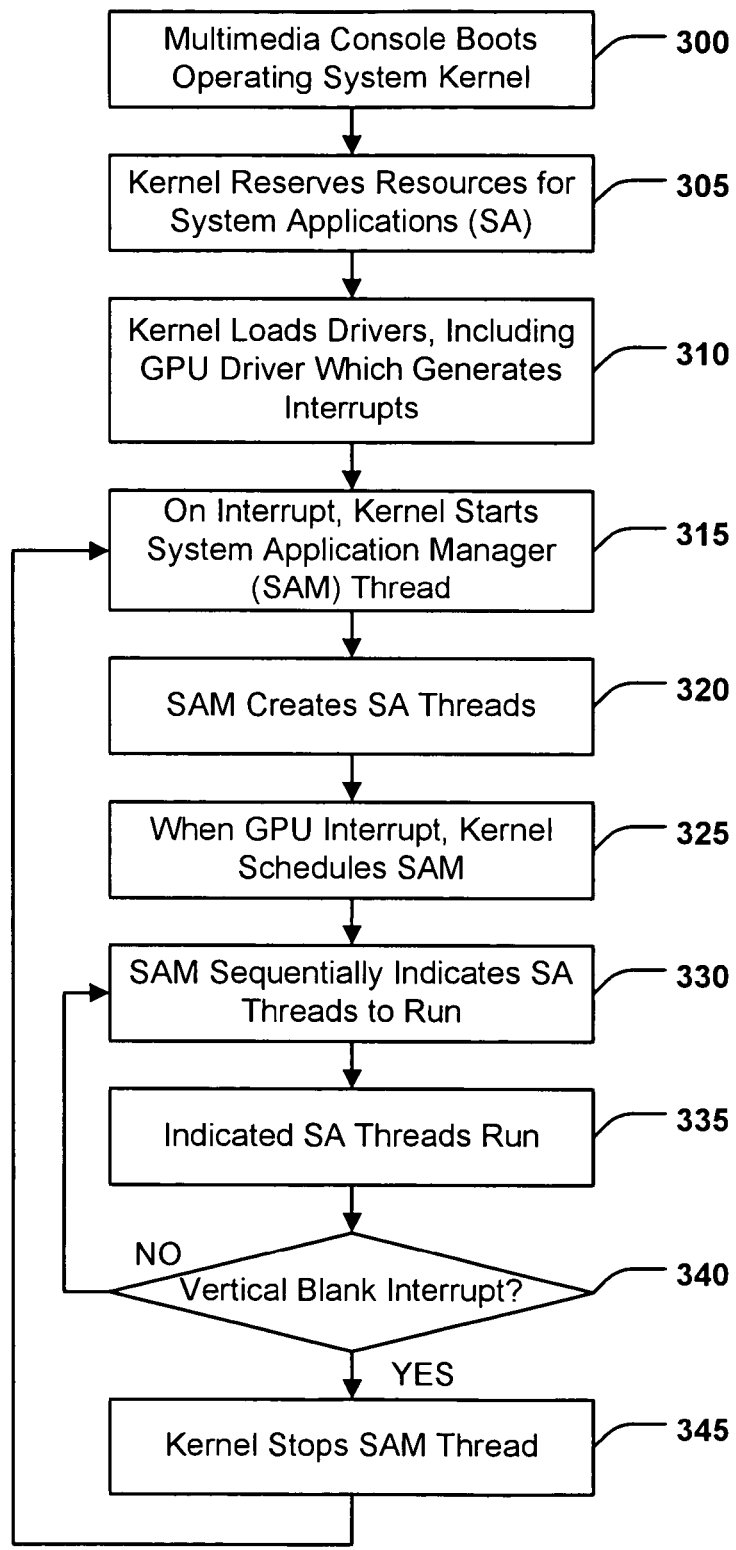
FIG. 3 is a flowchart of a method for providing system functionality via a system application in a multimedia console, in accordance with an aspect of the invention.

Referring now to FIG. 3, there is illustrated a flow diagram of an illustrative method for providing a system application in a multimedia console. As illustrated in FIG. 3, when multimedia console 100 is powered on or rebooted, multimedia console 100 boots an operating system kernel at step 300. For example, multimedia console 100 may execute boot code stored in ROM 106 to start an operating system kernel.

At step 305, the operating system kernel reserves resources for system applications. For example, the operating system kernel may reserve a predetermined amount of memory (e.g., 5 MB) for system applications and typically does not make this reserved memory available to the multimedia application. The kernel, drivers, system applications, and any other system-related code may reside in this reserved memory. If the system applications require less than the full amount of memory, the kernel typically still allocates and reserves the predetermined amount of memory so that a multimedia application sees a consistent amount of available memory. In particular, the memory reservation may be large enough to contain the launch kernel, system applications, and drivers. This reservation may allow for new system applications and drivers over the life of the multimedia console, as well as any anticipated expansion in the size of the system applications and driver footprint. Further, the operating system kernel may reserve a second predetermined amount of memory for use in communication between the multimedia application and the system applications.

At step 305, the operating system kernel may also reserve a predefined number of audio channels (monophonic streams) for use by a system application. For example, ten audio channels may be reserved out of roughly 300 available channels in a typical multimedia console. In this manner, the reserved audio channels may support 7.1 audio and an additional 2 voices for right/left sound effects. The reserved channels are typically not made available to the multimedia application (e.g., the game).

It is noted that this illustrative set of resources is not intended to be a limiting or exhaustive list of system resources that may be reserved. Because these resources are reserved at system boot time, the reserved resources do not exist from the multimedia application's point of view.

At step 310, the operating system kernel loads drivers. The drivers may include a GPU driver that sets up an interrupt. The interrupt may be a GPU interrupt, such as, for example, a programmable scan line interrupt that generates an interrupt when the video output reaches a predetermined scan line on the video display or may be another suitable interrupt source. The GPU interrupt may be used to keep in synch with the GPU video frame and system applications may be scheduled in response to a scan line interrupt from the GPU.

At step 315, when a GPU interrupt occurs, the operating system kernel starts a system application manager (SAM) thread. The SAM thread manages which system applications get executed on which CPU and when they get executed.

At step 320, the SAM thread creates a system application SA thread for each system application to be executed.

At step 325, the operating system kernel schedules the SAM thread to execute.

At step 330, the SAM thread sequentially indicates which SA thread to execute, and the indicated SA thread is executed at step 335. The kernel typically handles the actual scheduling of the SA threads on the CPUs.

At step 340, if the system application ending interrupt (e.g., the GPU vertical blank interrupt (VBI)) has not been generated by the GPU the method returns to step 330 to execute another SA thread. If the system application ending interrupt was generated, then the operating system kernel stops the SAM thread, at step 345. Also, if the system application ending interrupt is generated at any point during step 330 or 335, the currently executing SA thread is stopped and may be rescheduled for later execution.

As described above, the exemplary multimedia console 100 of FIG. 2 includes three CPUs. The reservation of CPU time (e.g., implemented via interrupts as described above in connection with FIG. 3) may be distributed among the CPUs in various fashions. For example, the multimedia application (e.g., game) may be executed on the first CPU 101A (and may also execute on the other CPUs) with no system applications being executed on the first CPU 101A. System applications may be scheduled at times on the other two CPUs, 101B and 101C. System applications may be scheduled for X % of CPU processing time on CPU 101B and Y % of CPU processing time on CPU 101C. Further, the X % and Y % of processing time may be scheduled at the end of processing a video frame. The X % and Y % of processing time may be equal (i.e., symmetric) or non-equal (i.e., asymmetric). Further, the determinations of the X % and Y % of processing time may be based on design requirements for system applications.

System application execution may be scheduled at known times (e.g., at the end of processing the video frame) to take advantage of typical characteristics of the multimedia console. For example, system applications may be executed at the end of a video frame when most CPU processing should be complete. System applications may be executed at regular intervals to ensure time-sensitive or time-critical code (e.g., voice chat audio, network interface, and the like) gets adequate execution time. Further, CPU 101B may be reserved for time critical system applications (e.g., voice) and CPU 101C may be reserved for non-time critical system applications (e.g., e-mail).

If the system applications do not use the reserved CPU time, the system may schedule an idle system thread to consume the remaining processing time. In this manner, the multimedia application sees a relatively constant system resource signature.

Figure 4:
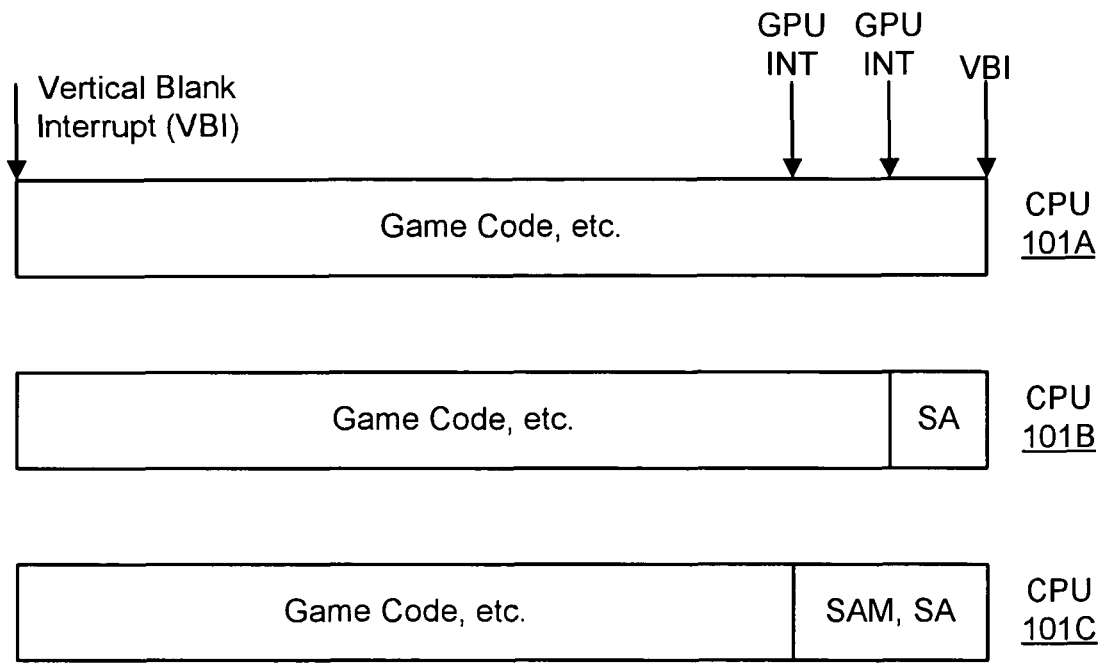
FIG. 4 is an diagram showing illustrative timing for providing system functionality via a system application in a multimedia console, in accordance with an aspect of the invention.

By executing system applications at the end of the video frame, the impact to cache memory (particularly L2 cache 104) may be reduced because most multimedia applications are completed before the end of the video frame. This avoids the complicated task of directly managing L2 cache 104 (e.g., directly reserving a distinct portion of L2 cache 104 for system applications). Instead, as depicted in FIG. 4, system applications are executed (based on a GPU interrupt to the CPU) at a predictable, constant frequency at the end of a video frame. It is anticipated that most multimedia applications will be completed processing (or nearly so) before the end of the video frame and therefore the system applications running at this particular point will be less likely to be disruptive to the use of the L2 cache.

As shown in FIG. 4, which is a time line diagram of the processing of each of the CPUs of FIG. 2, CPU 101A executes a multimedia application (e.g., game code) only. CPUs 101B and 101C execute the multimedia application until interruption by a GPU interrupt (also, CPUs 101B and 101C may not be executing any multimedia application code in the first portion of time shown in FIG. 4). As shown, CPU 101C executes a multimedia application until the first GPU interrupt in time. At that point in time, CPU 101C begins executing a system application (SA). Similarly, CPU 101B executes the multimedia application until the second GPU interrupt in time. At that point in time, CPU 101B begins executing a system application (SA). Also, the system application manager (SAM) is executed on CPU 101C, although the SAM may be executed on CPU 101B. Further, the CPU reservation amount may be maintained at a substantially constant level through the use of an idle thread that consumes any unused cycles if the reserved CPU usage is not being used by the system applications.

The system application may expect user input, however, conventional multimedia applications have complete control over user input (e.g., via game controller "gamepad" input, controllers 142(1) and 142(2)). As such, the user input or game controller input may be appropriately shared between the multimedia application and the system applications. In one embodiment, the user input is shared transparently between the system applications and the multimedia application. Typically, games are not aware of when they lose user input focus from the game input devices to system applications or when it is restored back to the game. Gamepad state (e.g., what buttons are pressed) is maintained when user input focus is switched to the system application. The state set on the gamepad by the game, while it does not have the input focus, may be queued and maintained until the user input focus is returned to the game. For example, if the game sets a gamepad vibration state (e.g., a state in which a vibration generating motor runs in the gamepad to cause the gamepad itself to vibrate) while the system application has the user input focus, this vibration state is queued (and updated) to be consistent when the user input focus is restored to the multimedia application. The input devices are not reserved resources, but are switched between the system applications and the multimedia application such that each will have the appropriate focus of the device. An application manager may control the switching of input stream, without the multimedia application's knowledge, and a driver may maintain state information regarding focus switches. Other types of user interaction are possible, such as pausing the multimedia application when the user interacts with the system application, etc.

There may be a case when a high priority task (e.g., a multimedia application task, such as, for example, specific digital encoding for an audio channel and the like) should be run when a system application is executing on a CPU during the portion of time reserved for system applications. For example, there may be a case when an audio task should run or the user may hear an audible pop which would be undesirable. At the same time, however, it is desirable that system applications receive sufficient processor time to complete their work. Otherwise, different undesirable results could occur, such as, for example, downloads timing out and the like. In such a situation, the kernel (in coordination with the SAM) may schedule a high priority task during the system application "window" (e.g., the time between the GPU interrupt and the VBI interrupt). Further, the kernel (in coordination with the SAM) may track how much processor time the system application lost due to this scheduling of the high priority task during the system application window. The kernel (in coordination with the SAM) "credits" this lost processor time back to the system application by executing the system application after the VBI (e.g., at the beginning of the next video frame). So, in effect, the system application may end up receiving the same amount of processing time, the execution just being shifted in time. This rescheduling at the beginning of a video frame, however, may have more L2 cache impact than at the end of a video frame. Also, a system application may be interrupted by a high priority task even during the portion of processor time at the beginning of the video frame.

Figure 5:
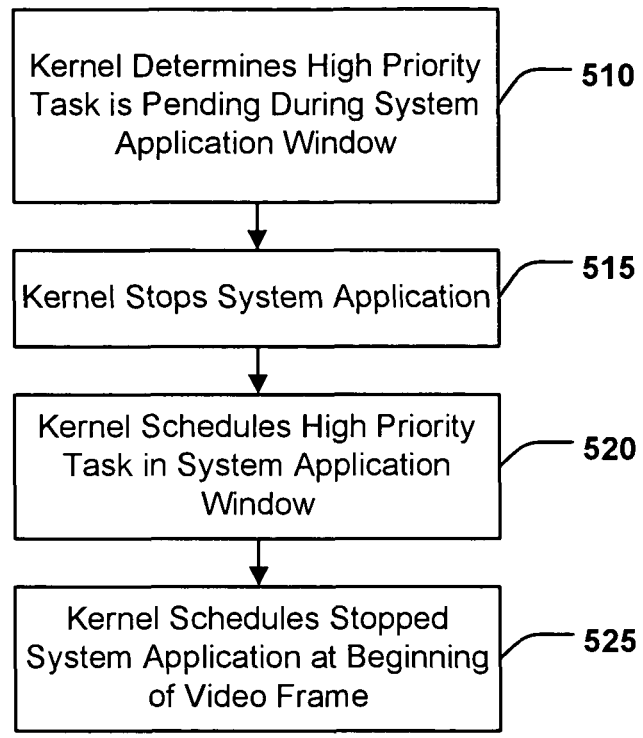
FIG. 5 is another flowchart of a method for providing system functionality via a system application in a multimedia console with handling of a high priority task, in accordance with an aspect of the invention.

An illustrative flow chart for handling a high priority task is shown in FIG. 5. At step 510, the kernel determines that a high priority task is pending while a system application is being executed on a CPU in the system application window (e.g., the time between the GPU interrupt and the VBI reserved for executing system applications). At step 515, the kernel stops the system application being executed in the system application window. At step 520, the kernel schedules the high priority task to execute on the CPU previously executing the stopped system application. At step 525, the kernel schedules the previously stopped system application to run at the beginning of the next video frame (e.g., subsequent to the VBI).

Figure 6:
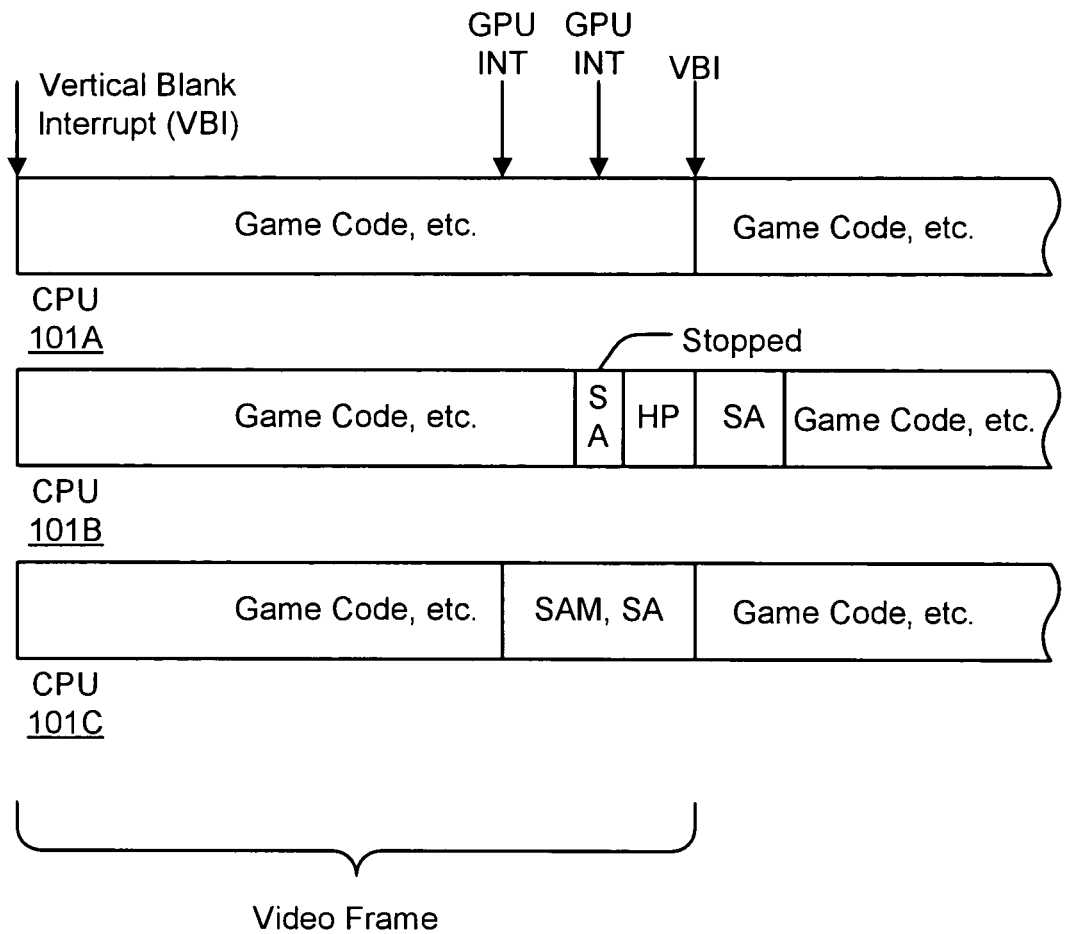
FIG. 6 is a diagram showing illustrative timing for providing system functionality via a system application in a multimedia console with handling of a high priority task, in accordance with an aspect of the invention.

FIG. 6 is a time line diagram of the processing of each of the CPUs of FIG. 2 illustrating the implementation of the flow diagram of FIG. 5. As shown in FIG. 6, CPU 101A executes a multimedia application (e.g., game code) only. CPUs 101B and 101C execute the multimedia application until interruption by a GPU interrupt. As shown, CPU 101C executes a multimedia application until the first GPU interrupt in time. At that point in time, CPU 101C begins executing a SA and the SAM. Similarly, CPU 101B executes the multimedia application until the second GPU interrupt in time. At that point in time, CPU 101B begins executing a SA. The SA executing on CPU 101B, however, is interrupted by the kernel because of a pending high priority task (HP). The kernel then schedules the HP to execute on CPU 101B. If there is no processing time left in the system application "window," the kernel schedules the previously stopped SA to execute on CPU 101B subsequent to the next VBI.

As noted above, the system applications provide system functionality as the multimedia application executes. The user may interact with either the system application or the multimedia application as desired. Where existing operating system architectures require that multimedia application manage both the multimedia application functionality and the system functionality, the systems and methods described herein provide hardware resources for the separate systems applications. As such, the multimedia application can manage the multimedia application functionality while the system functionality may be provided via the system applications.

As the foregoing illustrates, the invention is directed to providing a system application in a multimedia console. It is understood that changes may be made to the illustrative embodiments described above without departing from the broad inventive concepts disclosed herein. For example, while an illustrative embodiment has been described above as being implemented with three CPUs, it is understood that the invention may be embodied with any number of CPUs. Furthermore, while illustrative embodiments have been described as reserving memory, CPU time, and audio channels, other multimedia console resources may be reserved. Accordingly, it is understood that the invention is not limited to the particular embodiments disclosed, but is intended to cover all modifications that are within the spirit and scope of the invention as defined by the appended claims.

What is claimed:

1. A computer-implemented method implemented by an operating system of a multimedia console, the operating system being configured to execute a system application of a plurality of system applications and a multimedia application, the system application being configured to provide system functions to the multimedia application, the multimedia application being configured to provide multimedia functions, the computer-implemented method comprising:
reserving by the operating system, a predetermined, fixed amount of hardware resources of the multimedia console for the system application, the multimedia console having a central processing unit (CPU), a graphic processing unit, and a memory, the predetermined, fixed amount of hardware resources comprising a portion of processing time of the CPU;
executing, by the operating system, the system application using the predetermined fixed amount of reserved hardware resources;
executing, by the operating system, the multimedia application using a remaining unreserved hardware resources, the remaining unreserved hardware resources being inaccessible to the system application;
determining, by the operating system, that a sub-portion of the portion of processing time is unused by the system application;
executing, by the operating system, an idle thread in the sub-portion of the portion of processing time such that the system application and the idle thread consume the portion of processing time, the idle thread being separate from the system application and the multimedia application; and
executing a system application manager that prioritizes which system application of the plurality of system applications gets executed and causes scheduling each system application of the plurality of system applications to be executed at least once a predetermined number of video frames generated by the graphics processing unit.

2. The method as recited in claim 1, wherein reserving the predetermined fixed amount of hardware resources comprises reserving a first predetermined amount of memory for the system application.

3. The method as recited in claim 2, wherein reserving the predetermined fixed amount of hardware resources further comprises reserving a second predetermined amount of memory for facilitating communication between the multimedia application and the system application, wherein the second predetermined amount of memory is used by the system application.

4. The method as recited in claim 1, wherein reserving the predetermined fixed amount of hardware resources comprises reserving an amount of memory required by the system application in order to provide system functionality to the multimedia application.

5. The method as recited in claim 1, further comprising executing a system application manager that prioritizes which system application of a plurality of system applications gets executed.

6. The method as recited in claim 1, wherein the system application provides network capability to the multimedia application.

7. The method as recited in claim 1, wherein reserving the predetermined fixed amount of hardware resources comprises reserving at least one audio channel.

8. The method as recited in claim 1, wherein reserving the predetermined fixed amount of hardware resources comprises reserving at least ten audio channels.

9. The method as recited in claim 1, further comprising sharing an input device between the multimedia application and the system application, wherein sharing the input device comprises:
in response to receiving a first input from the input device directed to the multimedia application, the operating system setting a state of the input device based on the first input;
in response to receiving a second input from the input device directed to the system application, the operating system queuing the state of the input device; and
in response to receiving a third input from the input device directed to the multimedia application, the operating system restoring the state of the input device.

10. The method as recited in claim 1, wherein the CPU comprises a first and second CPUs, wherein reserving the predetermined fixed amount of hardware resources comprises reserving a portion of processing time of the second CPU for execution of the system application and not reserving a portion of processing time of the first CPU for execution by the system application, the unreserved portion of processing time of the second CPU being used for execution of the multimedia application, the first CPU being dedicated to executing the multimedia application and being inaccessible to the system application.

11. The method as recited in claim 1, wherein the CPU comprises a first, second, and third CPUs, wherein reserving the predetermined fixed amount of hardware resources comprises reserving a portion of processing time of the second and third CPUs for execution of the system application and not reserving a portion of processing time of the first CPU for execution by the system application, the unreserved portion of processing time of the second and third CPUs being used for execution of the multimedia application, the first CPU being dedicated to executing the multimedia application and being inaccessible to the system application.

12. The method as recited in claim 11, wherein the reserved portion of processing time of the second CPU is the same as the reserved portion of processing time of the third central processing unit.

13. The method as recited in claim 11, wherein the reserved portion of processing time of the second CPU is different than the reserved portion of processing time of the third central processing unit.

14. The method as recited in claim 11, wherein the second CPU executes a time critical system application and the third CPU executes a non-time critical system application.

15. A multimedia console, comprising:
a central processing unit (CPU);
a graphics processing unit;
a writable memory in communication with the graphics processing unit; and
a second memory in communication with the CPU, the second memory comprising executable code that, when executed on the multimedia console, causes an operating system of the multimedia console to configure hardware resources of the multimedia console for use by a system application, a multimedia application, and an idle thread, the system application being configured to provide a system service to the multimedia application and to run concurrently with the multimedia application, the multimedia application being configured to provide a multimedia service, the idle thread being separate from the system application and the multimedia application, the configuration of the hardware resources of the multimedia console comprising:

a reserved, fixed amount of the hardware resources of the multimedia console configured to execute the system application that provides the system service using the reserved, fixed amount of the hardware resources, the reserved, fixed amount of the hardware resources comprising a portion of processing time of the CPU;

a sub-portion of the portion of processing time of the CPU allocated to the idle thread, the system application and the idle thread being configured to consume the portion of processing time of the central processing unit;

a remaining unreserved amount of the hardware resources being dedicated to the multimedia application and being inaccessible to the system application, the multimedia application being configured to execute within the remaining unreserved amount of the hardware resources;

a scheduler for executing the system application and the idle thread in the portion of processing unit of time of the CPU, the scheduling comprising, upon detection of an interrupt command of the graphics processing unit, stopping the multimedia application from executing on the CPU and executing the system application and the idle thread in the portion of processing unit of time of the CPU; and executable code for executing a system application manager that prioritizes which system application of a plurality of system applications gets executed and causes scheduling each system application of the plurality of system applications to be executed at least once a predetermined number of video frames generated by the graphics processing unit.

16. The multimedia console as recited in claim 15, wherein the reserved, fixed amount of hardware resources comprises a first predetermined amount of memory for the system application.

17. The multimedia console as recited in claim 16, wherein the reserved, fixed amount of hardware resources further comprises a second fixed amount of memory for facilitating communication between the multimedia application and the system application, wherein the second fixed amount of memory is used by the system application.

18. The multimedia console as recited in claim 15, wherein the reserved, fixed amount of hardware resources comprises an amount of memory required by the system application in order to provide system functionality to the-multimedia application.

19. The multimedia console as recited in claim 15, wherein the system application provides network capability to the multimedia application.

20. The multimedia console as recited in claim 15, wherein the reserved, fixed amount of hardware resources comprises at least one audio channel.

21. The multimedia console as recited in claim 15, wherein the reserved, fixed amount of hardware resources comprises at least ten audio channels.

22. The multimedia console as recited in claim 15, wherein the second memory contains further executable code that performs sharing an input device between the multimedia application and the system application.

23. The multimedia console as recited in claim 15, wherein the-CPU comprises a first and second CPUs, wherein the reserved, fixed amount of hardware resources comprises a reserved portion of processing time of the second CPU for execution of the system application and an unreserved portion of processing time of the first CPU, the first CPU being dedicated to executing the multimedia application.

24. The multimedia console as recited in claim 15, wherein the CPU comprises a first, second, and third CPUs, wherein the reserved, fixed amount of hardware resources comprises a reserved portion of processing time of the second and third CPUs for execution of the system application and an unreserved portion of processing time of the CPU, the first CPU being dedicated to executing the multimedia application.

25. The multimedia console as recited in claim 24, wherein the reserved portion of processing time of the second CPU is the same as the reserved portion of processing time of the third CPU.

26. The multimedia console as recited in claim 24, wherein the reserved portion of processing time of the second CPU is different than the reserved portion of processing time of the third CPU.

27. The multimedia console as recited in claim 24, wherein the second CPU executes a time critical system application and the third CPU executes a non-time critical system application.

28. A computer-readable storage device, excluding signals, comprising instructions that, upon execution on a multimedia console, cause an operating system of the multimedia console at least to:

reserve a predetermined fixed amount of hardware resources of the multimedia console to a system application, the multimedia console having a central processing unit (CPU), a graphic processing unit, and a memory, the predetermined fixed amount of hardware resources comprising a portion of processing time of the CPU, the operating system being configured to execute the system application and a multimedia application, the system application being configured to provide a system function to the multimedia application, the multimedia application being configured to provide a multimedia function;

execute the system application using the predetermined fixed amount of reserved hardware resources;

execute the multimedia application using a remaining unreserved hardware resources, the remaining unreserved hardware resources being inaccessible to the system application;

determine that a sub-portion of the portion of processing time is unused by the system application;

execute an idle thread in the sub-portion of the portion of processing time such that the system application and the idle thread consume the portion of processing time, the idle thread being separate from the system application and the multimedia application; and execute a system application manager that prioritizes which system application of a plurality of system applications gets executed and causes scheduling each system application of the plurality of system applications to be executed at least once a predetermined number of video frames generated by the graphics processing unit.

29. The computer-readable storage device, excluding signals, of claim 28, wherein the instructions, upon execution on the multimedia console, further cause the operating system at least to share an input device between the multimedia application and the system application, wherein sharing the input device comprises:
- in response to receiving a first input from the input device directed to the multimedia application, set a state of the input device based on the first input;
- in response to receiving a second input from the input device directed to the system application, queue the state of the input device; and
- in response to receiving a third input from the input device directed to the multimedia application, restore the state of the input device.

30. The multimedia console as recited in claim 15, wherein the second memory contains further executable code for sharing an input device between the multimedia application and the system application, wherein sharing the input device comprises:
- in response to receiving a first input from the input device directed to the multimedia application, setting a state of the input device based on the first input;
- in response to receiving a second input from the input device directed to the system application, queuing the state of the input device; and
- in response to receiving a third input from the input device directed to the multimedia application, restoring the state of the input device.

* * * * *